United States Patent
Lee et al.

(10) Patent No.: US 8,695,939 B2
(45) Date of Patent: Apr. 15, 2014

(54) STAND STRUCTURE AND DISPLAY DEVICE

(75) Inventors: Yin-Ting Lee, Changhua County (TW); Chun-Yuan Chen, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 289 days.

(21) Appl. No.: 12/978,637

(22) Filed: Dec. 27, 2010

(65) Prior Publication Data

US 2012/0104194 A1   May 3, 2012

(30) Foreign Application Priority Data

Oct. 29, 2010   (TW) .............................. 99137278 A (51) Int. Cl.
*A47G 1/24*   (2006.01)
*A47B 97/04*   (2006.01)
*A47F 1/14*   (2006.01)
*G09F 11/12*   (2006.01)

(52) U.S. Cl.
USPC ........... 248/476; 248/457; 248/463; 248/455; 248/472; 248/466; 40/747; 40/753; 40/754; 40/755; 40/761; 40/762; 40/763; 40/764; 40/611.05; 361/679.06; 361/679.21

(58) Field of Classification Search
USPC ......... 248/454, 472, 474, 476, 477, 457, 463, 248/455, 456, 469, 468, 488, 466; 40/747, 40/754, 755, 756, 761–764, 611.05, 750, 40/752–753; 361/679.06, 679.21
See application file for complete search history.

(56) References Cited

U.S. PATENT DOCUMENTS

| | | | | | |
|---|---|---|---|---|---|
| 1,517,447 | A | * | 12/1924 | Merz | 292/145 |
| 1,702,263 | A | * | 2/1929 | Enfant | 40/780 |
| 2,008,093 | A | * | 7/1935 | Carwardine | 248/472 |
| 3,360,227 | A | * | 12/1967 | Overton et al. | 248/463 |

(Continued)

FOREIGN PATENT DOCUMENTS

| | | |
|---|---|---|
| CN | 201088359 | 7/2008 |
| CN | 101788100 | 7/2010 |

(Continued)

OTHER PUBLICATIONS

"Office Action of Taiwan counterpart application" issued on Oct. 29, 2012, p. 1-p. 11, in which the listed references were cited.

(Continued)

*Primary Examiner* — Terrell McKinnon
*Assistant Examiner* — Christopher Garft
(74) *Attorney, Agent, or Firm* — Jianq Chyun IP Office (57) ABSTRACT

A display device includes a body, a supporting member and a fastening member. The body has an accommodating portion, and the supporting member assembled to the accommodating portion for supporting the body is in the first state or the second state. The supporting member in the first state is switched to the second state when pivoting in an angle. The fastening member is detachably assembled to a first position or a second position of the supporting member, such that the supporting member is fastened to the accommodating portion of the body by the fastening member. The fastening member is assembled to the first position of the supporting member when the supporting member assembled to the accommodating portion is in the first state, and the fastening member is assembled to the second position of the supporting member when the supporting member assembled to the accommodating portion is in the second state.

17 Claims, 5 Drawing Sheets

(56) References Cited

U.S. PATENT DOCUMENTS

| | | | |
|---|---|---|---|
| 5,253,440 A * | 10/1993 | Chang | 40/748 |
| 5,329,712 A * | 7/1994 | Keller | 40/747 |
| 5,400,532 A * | 3/1995 | Grove | 40/721 |
| 5,438,777 A * | 8/1995 | Howell | 40/790 |
| 5,787,627 A * | 8/1998 | Snoke et al. | 40/791 |
| 5,933,996 A * | 8/1999 | Chang | 40/748 |
| 6,003,260 A * | 12/1999 | Chang | 40/748 |
| 7,299,580 B2 * | 11/2007 | Wang et al. | 40/719 |
| 7,753,336 B2 * | 7/2010 | Hu | 248/688 |
| 7,770,862 B2 * | 8/2010 | Chen | 248/351 |
| 2005/0263660 A1 * | 12/2005 | Hsiung | 248/291.1 |
| 2007/0181771 A1 * | 8/2007 | Alcov | 248/466 |
| 2007/0289188 A1 * | 12/2007 | Kohama | 40/754 |
| 2008/0016742 A1 * | 1/2008 | Hao | 40/753 |
| 2009/0014608 A1 * | 1/2009 | Yang | 248/176.3 |
| 2009/0223101 A1 * | 9/2009 | Wang et al. | 40/747 |
| 2011/0089307 A1 * | 4/2011 | Brooks et al. | 248/469 |

FOREIGN PATENT DOCUMENTS

| | | |
|---|---|---|
| TW | 573912 | 1/2004 |
| TW | M279275 | 11/2005 |
| TW | M319362 | 9/2007 |

OTHER PUBLICATIONS

"First Office Action of China Counterpart Application", issued on Mar. 21, 2012, p. 1-p. 5, in which the listed references were cited.

* cited by examiner

STAND STRUCTURE AND DISPLAY DEVICE

CROSS-REFERENCE TO RELATED APPLICATION

This application claims the priority benefit of Taiwan application serial no. 99137278, filed on Oct. 29, 2010. The entirety of the above-mentioned patent application is hereby incorporated by reference herein and made a part of this specification.

BACKGROUND OF THE INVENTION

1. Field of the Invention

The invention generally relates to a display device and in particular to a display device having a stand structure in different states.

2. Description of Related Art

The existing display devices, such as digital photo frames, can display the images in a single display orientation only, landscape or portrait, when using their own stands. As a result, the display orientation of the display device can not be switched when the orientations of the images are different from that of the display device and the demands for different display orientations of those images are needed.

The current solution to said problem lies in that the display device is additionally equipped with a pivoting stand having the pivoting structure by which the display orientation of the display device can be switched. However, it is rather inconvenient for users because redundant components and their specific connection manners with the display device are needed.

SUMMARY OF THE INVENTION

The invention provides a display device having different supporting states.

The invention provides a stand structure which can be assembled to a display device in different states.

Accordingly, an embodiment of the invention is directed to a display device comprising a body, a supporting member, and a fastening member. The body has an accommodating portion, and the supporting member is assembled to the body for supporting the body when the supporting member is in a first state or in a second state. The supporting member in the first state is switched to the second state when pivoting in a first angle. The fastening member is detachably assembled to a first position or a second position of the supporting member, such that the supporting member is assembled to the accommodating portion of the body through the fastening member. The fastening member is assembled to the first position of the supporting member when the supporting member assembled to the accommodating portion of the body is in the first state. The fastening member is assembled to the second position of the supporting member when the supporting member assembled to the accommodating portion of the body is in the second state.

An embodiment of the invention is directed to a stand structure suitable for a device having a fastening site. The stand structure includes a supporting member and a fastening member. The supporting member has at least two slots, and the fastening member is detachably assembled to one of the two slots of the supporting member. The supporting member is secured in the fastening site through the fastening member, such that the supporting member is assembled to the device and supports the device.

An embodiment of the invention is directed to a display device comprising a body, a supporting member, and a fastening member. The body has an opening and a fastening site that is located on a side of the opening. The supporting member is assembled to the opening. The supporting member has a first slot located on a first side of the supporting member and has a second slot located on a second side of the supporting member. The fastening member is assembled to one of the first slot and the second slot, such that the fastening member is secured at the fastening site.

According to an embodiment of the invention, the first angle is substantially 90 degrees.

According to an embodiment of the invention, the supporting member has a substantially symmetrical profile.

According to an embodiment of the invention, the supporting member includes a back plate and a clipping member. The back plate is detachably assembled to the accommodating portion of the body. The back plate has a polygonal shape and has at least two slots located on adjacent sides respectively, and the fastening member is detachably assembled to one of the slots. The clipping member is configured on the back plate and is an open state or in a close state with respect to the back plate.

According to an embodiment of the invention, the back plate further includes at least two alignment parts located on adjacent sides respectively. The accommodating portion of the body has a polygonal opening fitting the shape of the back plate. The body has at least three recesses located on adjacent sides respectively and corresponding to the alignment parts. The alignment parts lean against the body through two of the at least three recesses.

According to an embodiment of the invention, the clipping member includes a first stand, a resilient member, and a second stand. The resilient member connects the first stand and the back plate. The second stand is pivotally connected to the first stand. The first stand is in an open state with respect to the back plate when the second stand pivots around the first stand and leans between the first stand and the back plate, and the resilient member drives the first stand to be in a close state with respect to the back plate when the second stand pivots around the first stand and is stacked onto the first stand.

According to an embodiment of the invention, the clipping member further includes a third stand that is coupled to the first stand and slides between a third position and a fourth position with respect to the first stand. The orthogonal projection of the third stand with respect to the first stand overlaps with the first stand when the third stand is located at the third position, and the orthogonal projection of the third stand with respect to the first stand does not overlap with the first stand when the third stand is located at the fourth position.

According to an embodiment of the invention, the body further includes a sliding rail, a display surface, and a back surface opposite to the display surface. The accommodating portion is located on the back surface. The sliding rail is located on the display surface. The display device further includes a sliding member disposed in the sliding rail and sliding along the sliding rail.

According to an embodiment of the invention, the sliding rail has a first segment and a second segment. The sliding member stays in the first segment of the sliding rail when the supporting member assembled to the body is in the first state, and the sliding member stays in the second segment of the sliding rail when the supporting member assembled to the body is in the second state. The first segment and the second segment of the sliding rail include a second angle.

According to an embodiment of the invention, the supporting member includes a back plate and a clipping member. The back plate is detachably assembled to the opening of the body. The back plate has the first side, the second side, the first slot, and the second slot. The back plate and the body have the substantially fitting profile when the back plate is assembled to the opening of the body. The clipping member is assembled to the back plate and is in an open state or in a close state with respect to the back plate.

According to an embodiment of the invention, the body includes a first housing and a second housing. The first housing has a first inner surface, the display surface, and the sliding rail, and the inner surface is opposite to the display surface. The sliding rail connects the inner surface and the display surface. The second housing is assembled to the first housing and has the back surface and the opening.

According to an embodiment of the invention, the sliding member includes a top portion, a pair of securing posts, and a pair of stoppers. The top portion is located on the display surface and slides along the sliding rail. The securing posts are connected to the top portion and pass through the display surface along the sliding rail and protrude from the inner surface. The stoppers are located on the inner surface and telescope onto the pair of the securing posts to restrict the top portion onto the sliding rail.

According to an embodiment of the invention, the display device further includes a shielding sheet that is configured on the inner surface and covers the sliding rail.

According to the embodiments of the invention described above, the supporting member assembled to the body has different supporting states because the fastening member is respectively secured into one of the slots of the supporting member. Thereby, the display device can be switched into different display orientations. As such, the display device does not need any additional components, and the demands of users for different display orientations can be satisfied by using the stand structure possessed by display device. This will effectively decrease the manufacturing cost and increase the utility for users.

In order to the make the aforementioned and other features and advantages of the invention comprehensible, several embodiments accompanied with figures are described in detail below.

DESCRIPTION OF THE EMBODIMENTS

Figure 1A:
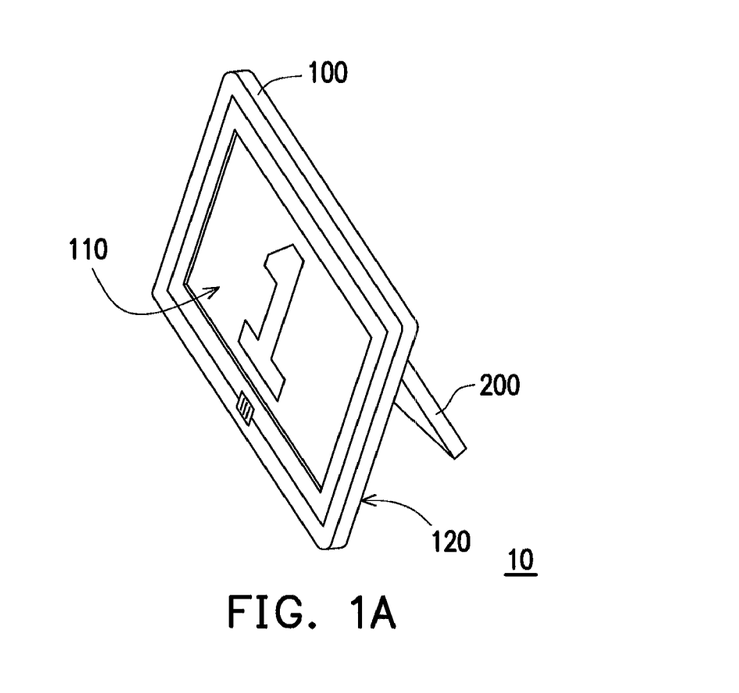
FIG. 1A and FIG. 1B are respective schematic views illustrating a display device in different states according to an embodiment of the invention.
Figure 1B:
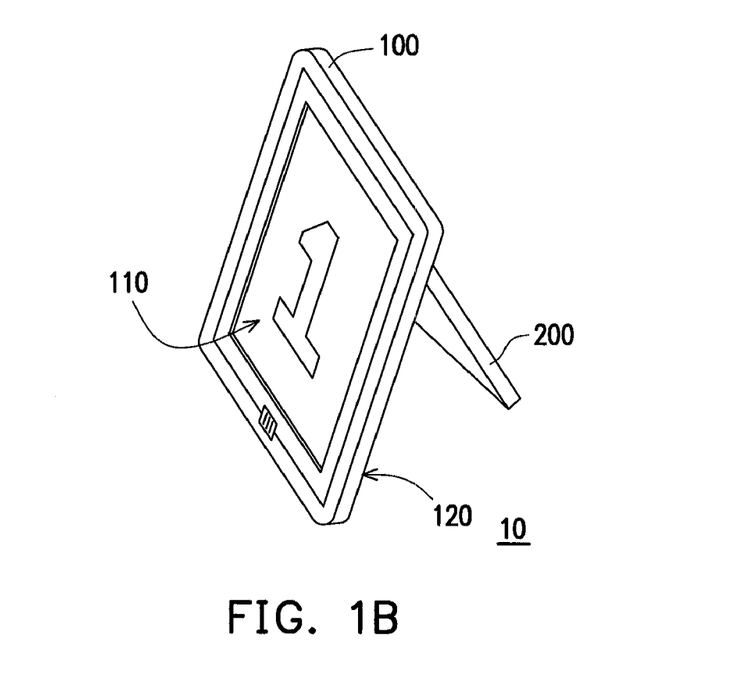

FIG. 1A and FIG. 1B are respective schematic views illustrating a display device in different states according to an embodiment of the invention. FIG. 2A to FIG. 2D are schematic views illustrating the display device in different states switched from that depicted in FIG. 1A to that depicted in FIG. 1B. The display device in FIG. 1A is in a landscape orientation, and the display device in FIG. 1B is in a portrait orientation. However, the embodiment is not limited to the illustration above. As shown in FIG. 1A, FIG. 1B, and FIG. 2A to FIG. 2B, in the embodiment, the display device 10 is, for example, a digital photo frame or any other appropriate display device, and the display device 10 includes a body 100 and a stand structure 200. The body 100 has a display surface 110, a back surface 120, and an accommodating portion 130 located on the back surface 120. The display surface 110 is opposite to the back surface 120, and the accommodating portion 130 is an opening, for example. The display surface 110 displays images to viewers, and the stand structure 200 is configured on the back surface 120 of the body 100 to support the body 100.

Figure 2A:
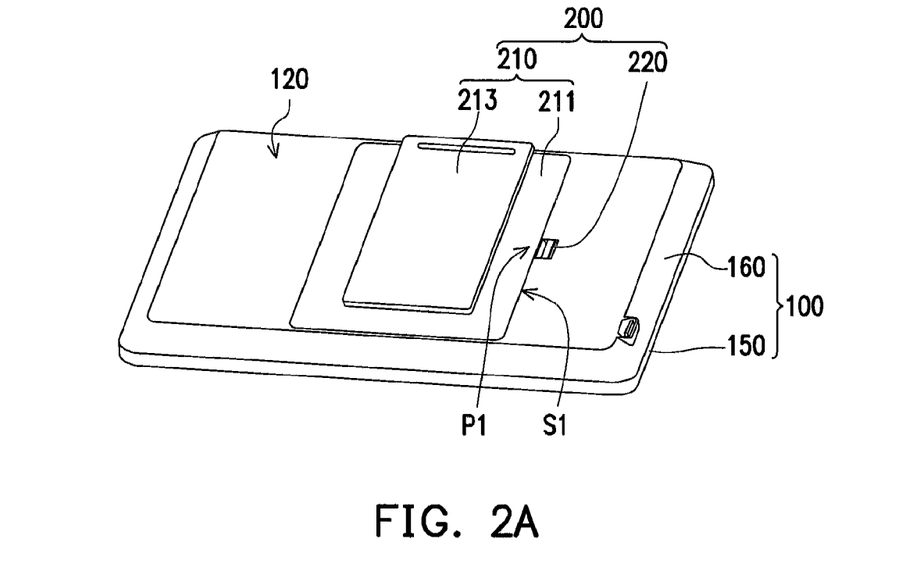
FIG. 2A to FIG. 2D are schematic views illustrating the display device in different states switched from that depicted in FIG. 1A to that depicted in FIG. 1B.
Figure 2B:
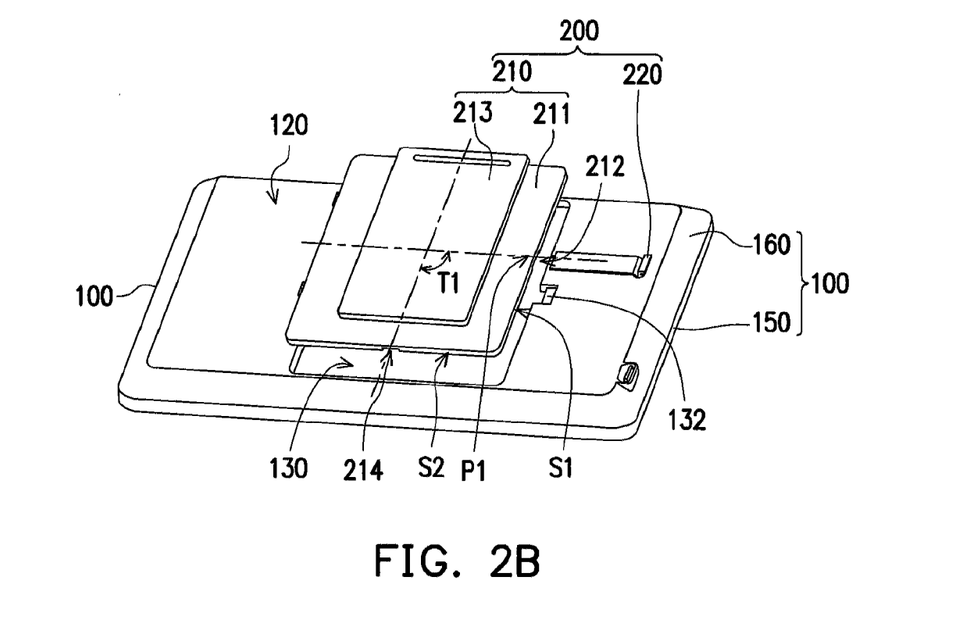
Figure 2C:
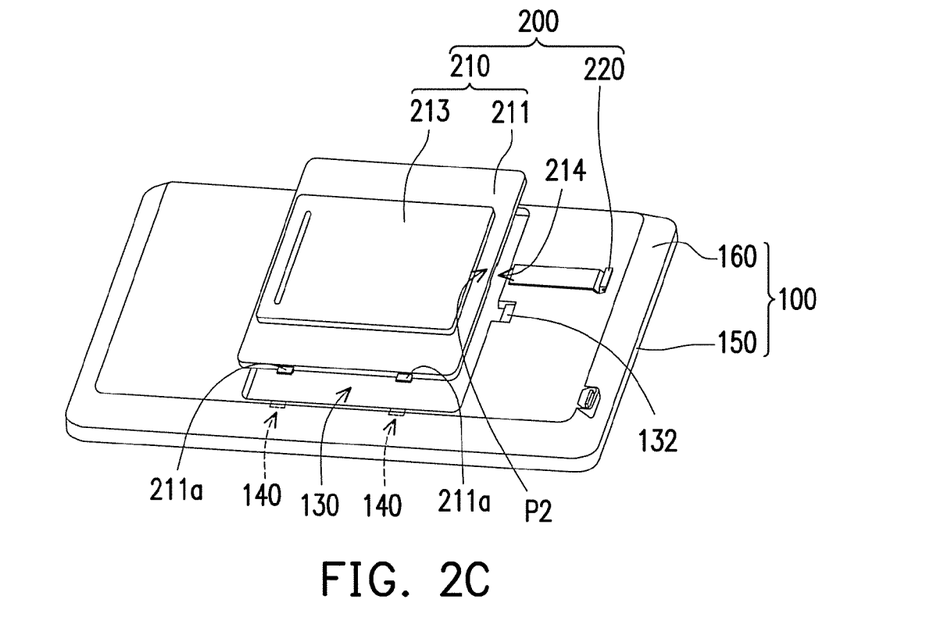

In the present embodiment, the stand structure 200 includes a supporting member 210 and a fastening member 220. The supporting member 210 is assembled to the accommodation portion 130 when the supporting member 210 is in the first state (as shown in FIG. 2A) or in the second state (as shown in FIG. 2A), so as to support the body 100. The supporting member 210 in the first state is switched from the supporting member 210 that is in the second state and pivots in a first angle T1.

The fastening member 220 is detachably assembled to the first position P1 and the second position P2 of the supporting member 210, and the fastening member 220 is substantially inserted in a first slot 212 located on the first side Si of the supporting member 210 when the fastening member 220 is located at the first position P1 with respect to the supporting member 210. Similarly, the fastening member 220 is substantially inserted in a second slot 214 located on the second side S2 of the supporting member 210 when the fastening member 220 is located at the second position P2 with respect to the supporting member 210. Here, the first side Si is adjacent to the second side S2. Therefore, no matter the fastening member 220 is located at the first position P1 or the second position P2, the supporting member 210 can be assembled to the back surface 120 of the body 100 through the fastening member that is secured in a fastening site 132 located on a side of the accommodating portion 130.

In the present embodiment, the supporting member 210 includes a back plate 211 and a clipping member 213. The back plate 211 is detachably assembled to the accommodating portion 130, and the clipping member 213 is configured on the back plate 211 and can be in an open or close state with respect to the back plate 211 to serve as a supporting structure that supports the body 100. Furthermore, the back plate 211 has the first slot 212 and the second slot 214 as mentioned above, and the fastening member 220 can be assembled to one of the first slot 212 and the second slot 214 respectively, such that the supporting member 210 can support the body 100 when the supporting member 210 are in different states. It is worthy to mention that the back plate 211 has a substantially symmetrical profile, such that the back plate 211 can be assembled to the accommodating portion 130 after pivoting. In the present embodiment, the back plate 21 has a square shape, and the accommodating portion 130 correspondingly has the fitting square opening, such that the fastening member 220 can be detachably assembled to the first slot 212 or the second slot 214, which allows the supporting member 210 pivot in the first angle T1 of substantially 90 degrees and support the body 100. Therefore, the display device 10 can have different display states as shown in FIG. 1A and FIG. 1B. However, the invention is not limited to those mentioned above. In another embodiment not shown by the drawings, the back plate can also be in a circular shape or can be a polygon having the symmetrical profile.

Therefore, the shapes of the supporting member and the accommodating portion of the body can be designed according to the shape of the body 100 of the display device 10, and this allows the display device to have a variety of display states.

Additionally, the body 100 further has a plurality of recesses 140 located beside the accommodating portion 130, and the recesses 140 correspond to a plurality of alignment parts 211*a* located on adjacent sides of the back plate 211. In the present embodiment, these recesses 140 are respectively located on adjacent sides of the accommodating portion 130, and no matter the fastening member 220 is located at the first position P1 or at the second position P2 with respect to the supporting member 210, the alignment parts 211*a* of the back plate 211 can lean against the body 100 through some of the recesses 140, such that the supporting member 210, no matter in the first state or in the second state, can reach a favorable securing effect on the body 100.

The quantity and the locations of the fastening member 132, the recesses 140, and the slots 212, 214 of the supporting member 140 are not limited in this embodiment and can be adjusted appropriately according to the display demand for display device 10.

Figure 2D:
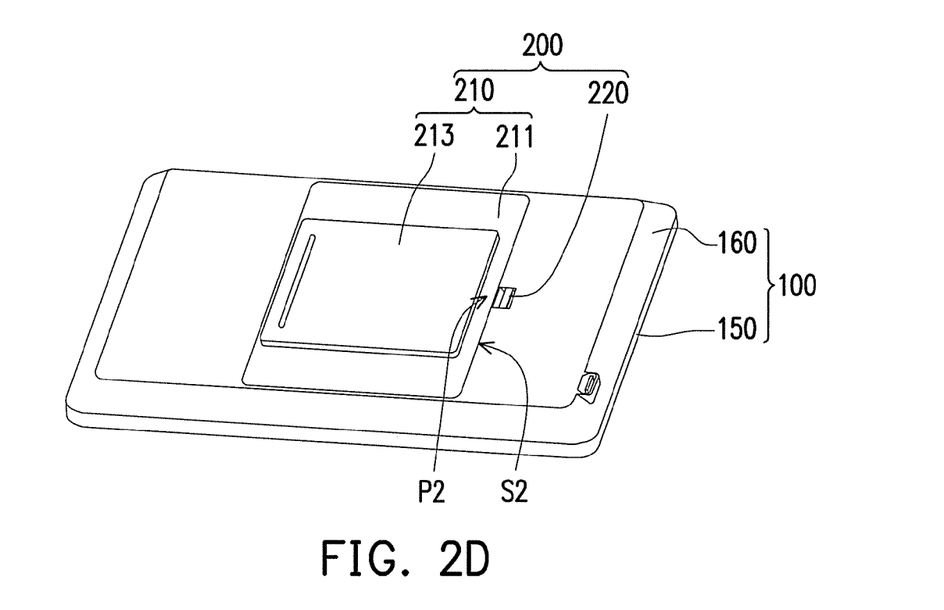
Figure 3A:
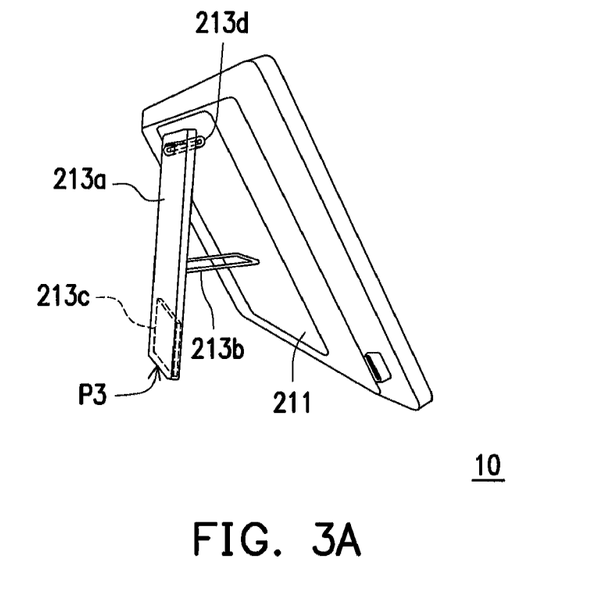
FIG. 3A and FIG. 3B are schematic views illustrating the display device shown in FIG. 1A and FIG. 1B in different standing states.
Figure 3B:
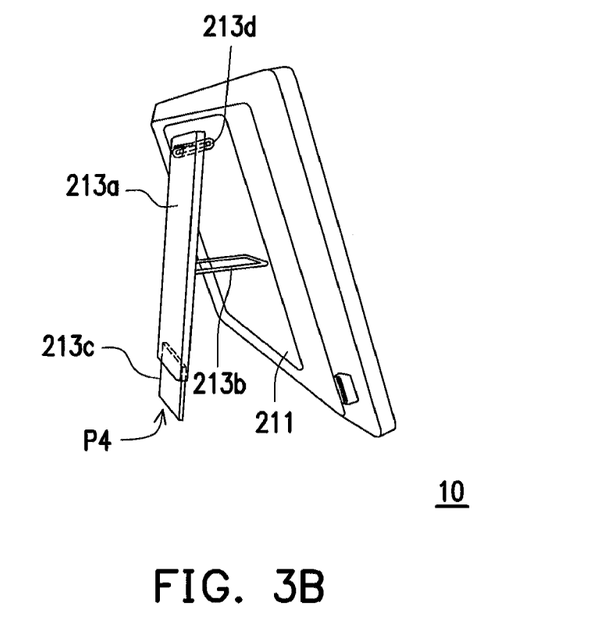

FIG. 3A and FIG. 3B are schematic views illustrating the display device shown in FIG. 1A and FIG. 1B in different standing states. As shown in FIG. 3A and FIG. 3B, in the present embodiment, the clipping member 213 includes a first stand 213*a*, a second stand 213*b*, and a resilient member 213*d*. The resilient member 213*d* connects the first stand 213*a* and the back plate 211, and the second stand 213*b* is pivotally connected to the first stand 213*a*. The first stand 213*a* is in an open state with respect to the back plate 211 when the second stand 213*b* pivots around the first stand 213*a* and then leans between the first stand 213*a* and the back plate 211. By contrast, the resilient member 213*d* drives the first stand 213*a* to be in a close state with respect to the back plate 211 when the second stand 213*b* pivots around the first stand 213*a* and is stacked onto the first stand 213*a* (as shown in FIG. 2A or FIG. 2D). In other words, in this embodiment, the resilient member 213*d* internally includes a torsion spring, for example, such that the first stand 213*a* and the resilient member 213*d* form a back clipping mechanism by which the display device 10 can be clipped onto an appropriate article. That is to say, the display device 10 can be set on a platform (not shown) when the second stand 213*b* pivots away from the first stand 213*a* and then leans against the back plate 211.

Moreover, the clipping member 213 further includes a third stand 213*c* coupled to the first stand 213*a*, and the third stand 213 c can slide between a third position P3 and a fourth position P4 with respect to the first stand 213*a*. The orthogonal projection of the third stand 213*c* on the first stand 213*a* overlaps with the first stand 213*a* when the third stand 213*c* is located at the third position P3, and the orthogonal projection of the third stand 213*c* on the first stand 213*a* does not overlap with the first stand 213*a* when the third stand 213*c* is located at the fourth position P4. In other words, the third stand 213*c* in this embodiment serves as an extension component of the first stand 213*a* for adjusting the supporting angle at which the body 100 of the display device 10 is supported by the supporting 210 in order to meet users' viewing angle. Based on the aforementioned, users can adjust the state of the display device 10 through the stands 213*a*, 213*b*, 213*c*, and the resilient member 213*d* according to the users' operation environment.

Figure 4:
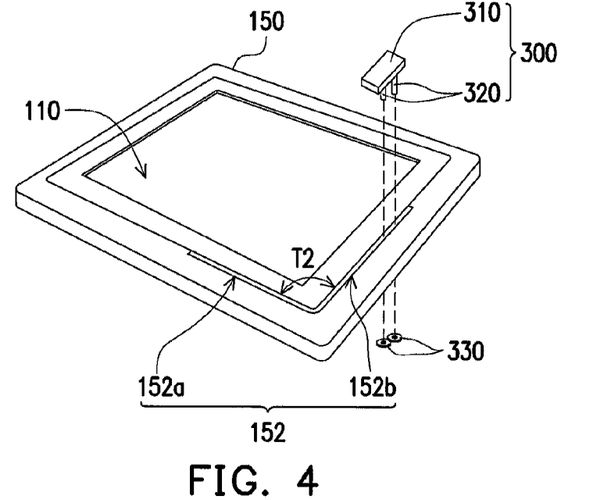
FIG. 4 is a schematic view illustrating the assembly of partial components of the display device shown in FIG. 1A and FIG. 1B.
Figure 5:
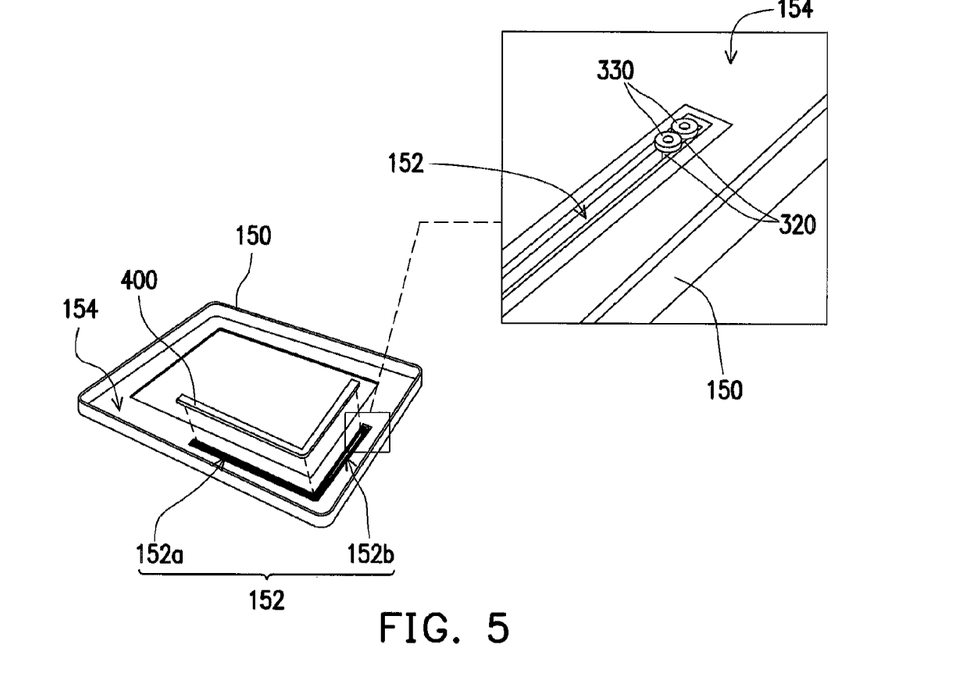
FIG. 5 is a schematic view illustrating the assembly of the partial components of FIG. 4 in a viewing angle different from that of FIG. 4.

FIG. 4 is a schematic view illustrating the assembly of partial components of the display device shown in FIG. 1A and FIG. 1B. FIG. 5 is a schematic view illustrating the assembly of the partial components of FIG. 4 in a viewing angle different from that of FIG. 4. As shown in FIG. 4 and FIG. 5, in this embodiment, the body 100 includes a first housing 150 and a second housing 160 which are assembled together (denoted in FIG. 2A to FIG. 2D). The first housing 150 has the display surface 110 mentioned above, a sliding rail 152, and an inner surface 154. The display surface 110 is opposite to the inner surface 154, and the sliding rail 152 connects the display surface 110 with the inner surface 154. The second housing 160 has the back surface 120 and the accommodating portion 130 mentioned above.

Furthermore, the display device 10 further includes a sliding member 300 disposed on the sliding rail 152. The sliding member 300 can slide along the sliding rail 152 on the display surface 110. In this embodiment, the sliding rail 152 has a first segment 152*a* and a second segment 152*b*. The sliding member 300 is located on the first segment 152*a* when the supporting member 210 assembled to the body 100 is in the first state (as shown in FIG. 1A and FIG. 2A). The sliding member 300 can move to the second segment 152*b* when the supporting member 210 assembled to the body 100 is in the second state (as shown in FIG. 1B and FIG. 2D). Furthermore, the first segment 152*a* and the second segment 152*b* include a second angle T2 which is 90 degrees in this embodiment.

Here, the sliding member 300 is, for example, a marking component of the display device 10 because it can slide along the sliding rail 150 and slide to positions corresponding to different display states of the display device 10. For example, the sliding member 300 includes a top portion 310, a pair of securing posts 320 extending from the top portion 310, and a pair of stoppers 330,. The top portion 310 is located on the display surface 110 and slides along the sliding rail 150. The securing posts 320 are connected to the top portion 310 and pass through the display surface 110 along the sliding rail 152 and protrude from the inner surface 154. The stoppers 330 are located on the inner surface 154 and telescope onto the securing posts 320, respectively. Therefore, by using the pair of securing posts 320, the top portion 310 will slide along the sliding rail 152 and is precluded from pivoting, and by using the stoppers 330, the top portion 310 can be restricted to slide on the display surface 110 and can be prevented from falling down from the display surface 110. In addition, the display device 10 further includes a shielding sheet 400 which is attached to the inner surface 154 and covers the sliding rail 150, so as to allow the display device 10 to have a simple look. Thereby, the top portion 310 can slide along the sliding rail 150 on the display surface 110. Moreover, when the display device 10, as shown in FIG. 1A, is in a landscape state, the sliding member 300 can slide to the first segment 152*a*, and when the display device 10, as shown in FIG. 1B, is in a portrait state, the sliding member 300 can slide to the second segment 152*b*. As such, the sliding member 300 can slide to positions corresponding to the states of the supporting member 210 assembled to the body 100, and the sliding member 300 will achieve a consistent visual effect on the display device 10 in different states. For example, when the sliding member 300 includes a logo design for corporate identity, the logo design is arranged in strict accordance with corporate rules (e.g., in a landscape or portrait orientation) to polish the corporate images. Therefore, when the invention is applied to an actual product, given the logo design on the product is set to be in a landscape orientation, the sliding member 300 is located on the first segment 152*a* when the display device 10 is in the landscape state, such that the sliding member 300 serving as the logo can be maintained in the landscape state. Even when the display device 10 is switched to be in the portrait state, the sliding member 300 can move to the second segment 152b, such that the sliding member 300 serving as the logo can still be maintained in the landscape state.

In light of the foregoing, according to the embodiment of the invention, the supporting member assembled to the body can support the body in different manners by securing the fastening member into one of the slots of the supporting member, and thereby the display device can switch between different display states. As a result, the demand for the display device in different display states can be satisfied by the stands of the display device itself instead of by additional components assembled to the display device.

Furthermore, the display device can have different arrangements (e.g., the display device can be clipped on certain objects or can stand on a platform) because of the changes of the stands of the supporting member, and the sliding member can slide to the positions corresponding to different display states of the display device. Accordingly, owing to the stands, the display device can have a low manufacturing cost barrier, increased utility, and pleasant appearance.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A display device, comprising:
    a body having an accommodating portion;
    a supporting member assembled to the accommodating portion for supporting the body when the supporting member is in a first state or in a second state, wherein the supporting member in the first state is switched to the second state when pivoting in a first angle; and
    a fastening member detachably assembled to a first position or a second position of the supporting member and at a fastening site of the accommodating portion of the body, such that the supporting member is assembled to the accommodating portion of the body through the fastening member, and the fastening site is the same whether the fastening member is detachably assembled to the first position or the second position of the supporting member,
    wherein the fastening member is assembled to the first position of the supporting member when the supporting member assembled to the accommodating portion of the body is in the first state, and the fastening member is assembled to the second position of the supporting member when the supporting member assembled to the accommodating portion of the body is in the second state; and wherein the first position and the second position are located on adjacent sides of the sliding member.

2. The display device according to claim 1, wherein the first angle is substantially 90 degrees.

3. The display device according to claim 1, wherein the supporting member has a substantially symmetrical profile.

4. The display device according to claim 3, wherein the supporting member comprises:
    a back plate detachably assembled to the accommodating portion of the body, wherein the back plate has a polygonal shape and has at least two slots located on adjacent sides respectively, and the fastening member is detachably assembled to one of the slots; and
    a clipping member configured on the back plate, the clipping member being in an open state or in a close state with respect to the back plate.

5. The display device according to claim 4, wherein the back plate further comprises at least two alignment parts protruded from an edge of the back plate, the accommodating portion of the body is a polygonal opening fitting the shape of the back plate, and the body has a plurality of recesses located on adjacent sides respectively and corresponding to the at least two alignment parts, wherein the at least two alignment parts lean against the body through two of the recesses when the back plate is assembled to the accommodating portion in the first state or in the second state.

6. The display device according to claim 4, wherein the clipping member comprises:
    a first stand;
    a resilient member connecting the first stand and the back plate; and
    a second stand pivotally connected to the first stand, wherein the first stand is in an open state with respect to the back plate when the second stand pivots around the first stand and leans between the first stand and the back plate, and the resilient member drives the first stand to be in a close state with respect to the back plate when the second stand pivots around the first stand and is stacked onto the first stand.

7. The display device according to claim 6, wherein the clipping member further comprises a third stand coupled to the first stand and sliding between a third position and a fourth position with respect to the first stand, wherein the third stand is hidden in the first stand when the third stand is located at the third position, and the third stand is dragged from the first stand and overlapped with part of the first stand when the third stand is located at the fourth position.

8. The display device according to claim 1, wherein the body further comprises a sliding rail, a display surface, and a back surface opposite to the display surface, wherein the accommodating portion is located on the back surface, the sliding rail is located on the display surface, and the display device further comprises a sliding member disposed in the sliding rail and sliding along the sliding rail.

9. The display device according to claim 8, wherein the sliding rail has a first segment and a second segment, the sliding member stays in the first segment of the sliding rail when the supporting member assembled to the body is in the first state, the sliding member stays in the second segment of the sliding rail when the supporting member assembled to the body is in the second state, and the first segment and the second segment of the sliding rail include a second angle.

10. A display device, comprising:
    a body having an opening and a fastening site located on one of a plurality of edges of the opening;
    a supporting member assembled to the opening and having a first slot located on a first side of the supporting member and a second slot located on a second side of the supporting member; the first and second sides being adjacent to one another; and
    a fastening member assembled to one of the first slot and the second slot, such that the supporting member rotates relative to the body in different states, and the fastening member is secured at the fastening site.

11. The display device according to claim 10, wherein the supporting member is a polygon with symmetrical profile, and the first side is adjacent to the second side.

12. The display device according to claim 10, wherein the supporting member comprises:

a back plate detachably assembled to the opening of the body, wherein the back plate has the first side, the second side, the first slot and the second slot, and the back plate and the body have substantially fitting profile when the back plate is assembled to the opening of the body; and a clipping member configured on the back plate, the clipping member being in an open state with an edge of the clipping member attached onto the back plate or in a close state with respect to the back plate.

13. The display device according to claim 10, wherein the body further comprises a sliding rail, a display surface, and a back surface opposite to the display surface, wherein the opening is located on the back surface, the sliding rail is located on the display surface, and the display device further comprises a sliding member disposed in the sliding rail and sliding along the sliding rail.

14. The display device according to claim 13, wherein the body comprises:

a first housing having a first inner surface, the display surface, and the sliding rail, wherein the inner surface is opposite to the display surface, and the sliding rail connects the inner surface and the display surface; and a second housing assembled to the first housing and having the back surface and the opening.

15. The display device according to claim 14, wherein the sliding member comprises:

a top portion located on the display surface and sliding along the sliding rail;

a pair of securing posts connected to the top portion and passing through the display surface along the sliding rail and protruding from the inner surface; and a pair of stoppers located on the inner surface and telescoping onto the pair of the securing posts to restrict the top portion onto the sliding rail.

16. The display device according to claim 14, further comprising a shielding sheet configured on the inner surface and covering the sliding rail.

17. The display device according to claim 13, wherein the sliding rail comprises a first segment and a second segment, and the first segment and the second segment of the sliding rail include an angle.

* * * * *